L. F. FALES.
MIXING MACHINE.
APPLICATION FILED APR. 8, 1912.

1,050,726.

Patented Jan. 14, 1913.
3 SHEETS—SHEET 1.

Witnesses:
L. B. Weymouth
Charles F. Burtt

Inventor:
Lewis F. Fales
By Henry J. Miller
atty.

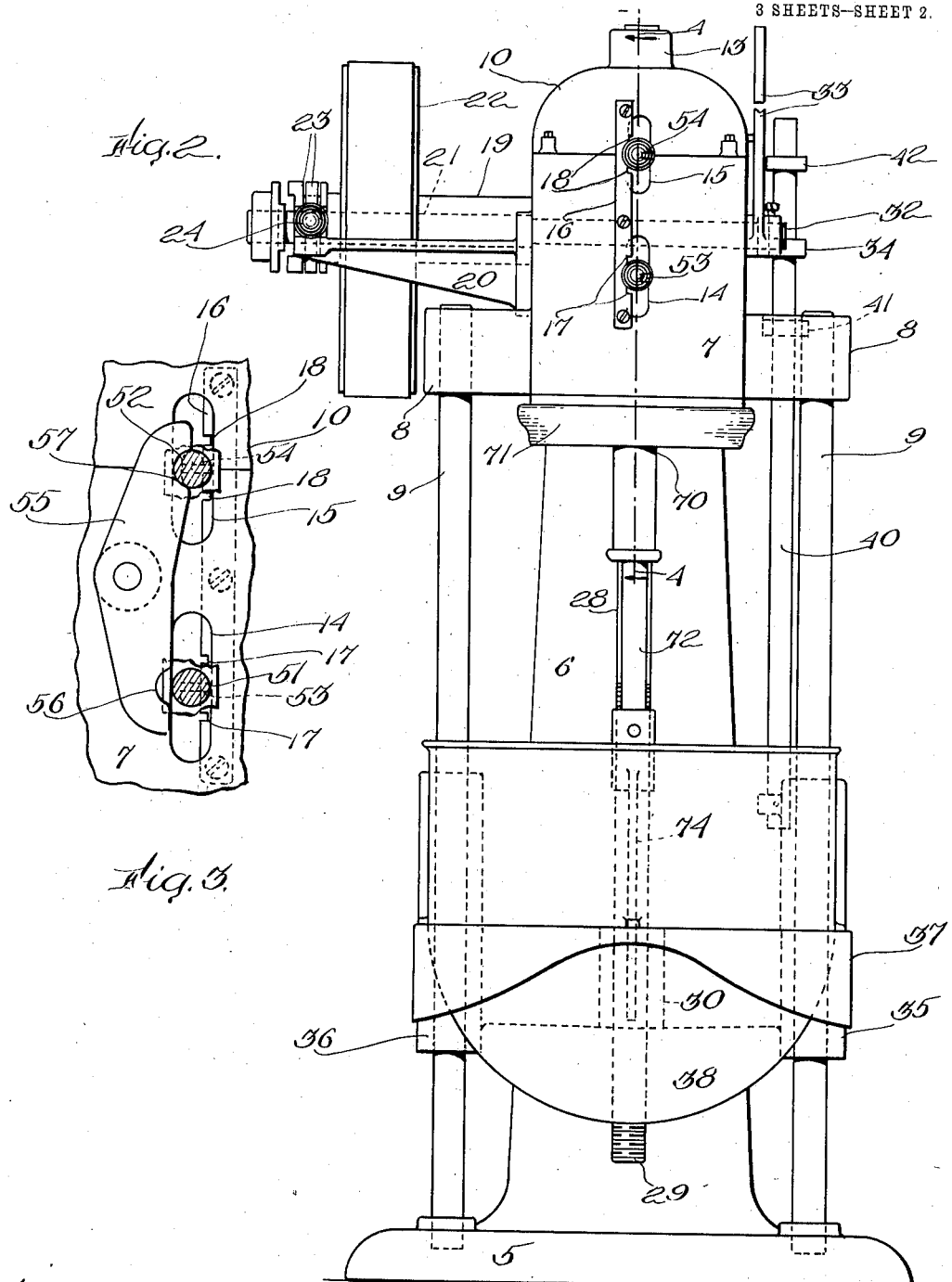

L. F. FALES.
MIXING MACHINE.
APPLICATION FILED APR. 8, 1912.

1,050,726.

Patented Jan. 14, 1913.

3 SHEETS—SHEET 3.

Witnesses:
L. B. Weymouth
Charles F. Burt

Inventor:
Lewis F. Fales
By Henry J. Miller
atty.

UNITED STATES PATENT OFFICE.

LEWIS F. FALES, OF WALPOLE, MASSACHUSETTS.

MIXING-MACHINE.

1,050,726.  Specification of Letters Patent. Patented Jan. 14, 1913.

Application filed April 8, 1912. Serial No. 689,303.

*To all whom it may concern:*

Be it known that I, LEWIS F. FALES, of Walpole, in the county of Norfolk and State of Massachusetts, have invented certain new and useful Improvements in Mixing-Machines, of which the following is a specification, reference being had to the accompanying drawings, forming part thereof.

This invention has reference to improvements in mixing machines particularly adapted for the mixing of dough and similar material.

One object of the invention is to so construct a mixing machine of the nature described that all portions of the material under operation may be thoroughly manipulated and mixed.

Another object of the invention is to so construct a mixing machine of this nature that the operation of the mechanism on the material may be varied from time to time and that the control of such mechanism may be facilitated.

Other objects of the invention will appear from the following description.

The invention consists in such novel features of construction and combination of parts as shall hereinafter be more fully described and pointed out in the claims.

Figure 1:
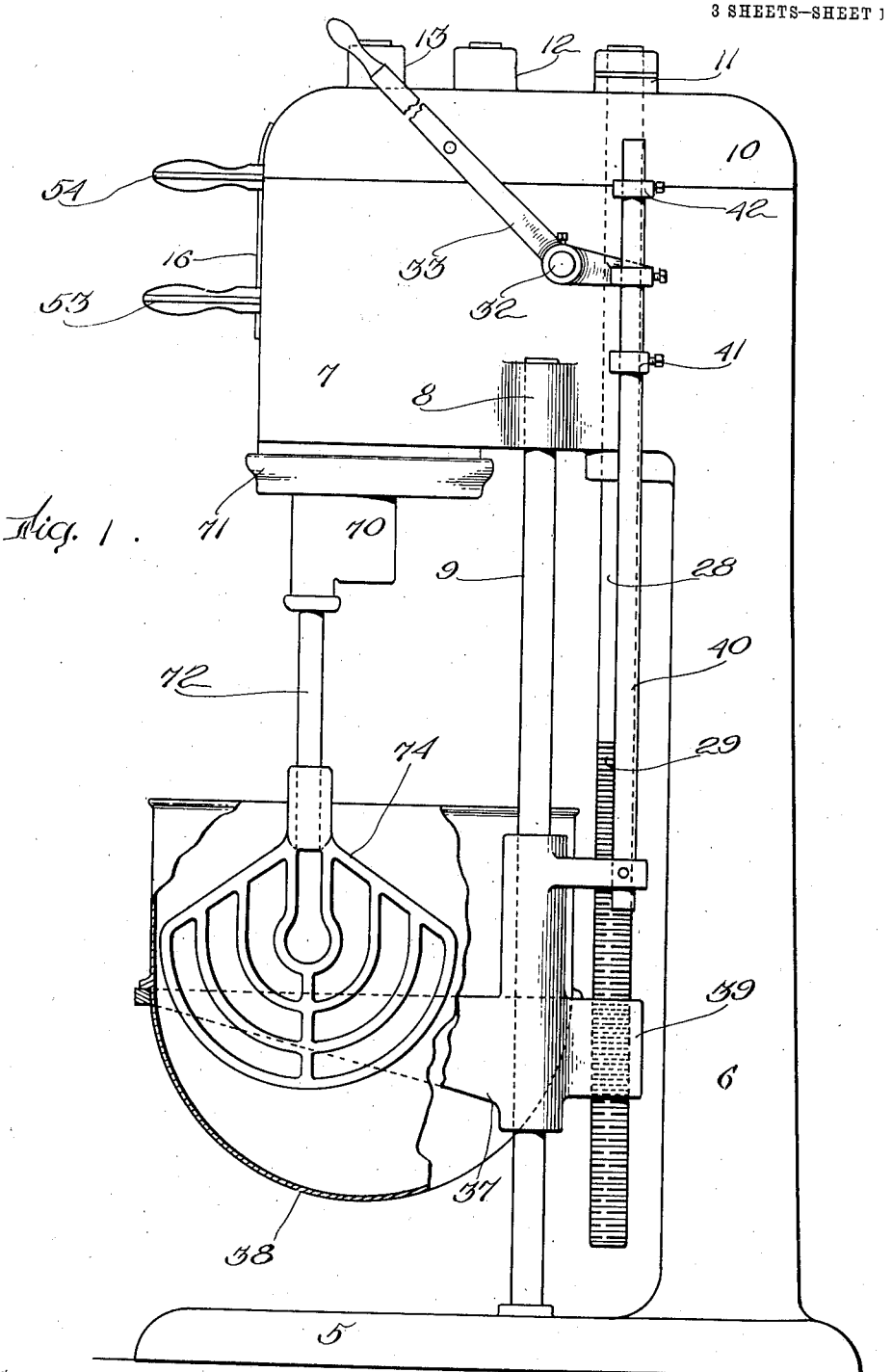
Figure 4:
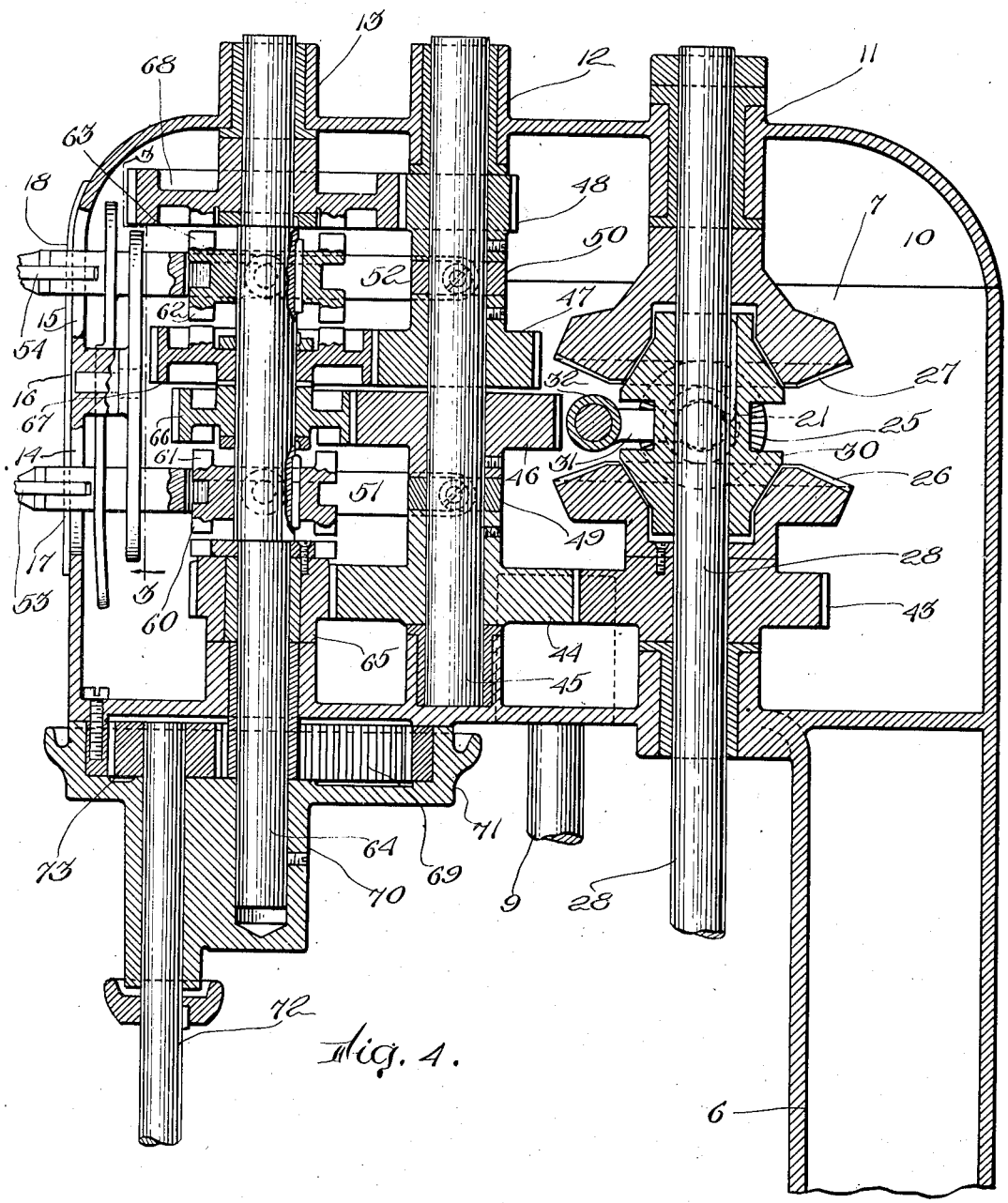

Figure 1, represents a side elevation of the new mixing machine, portions of the mixing bucket or container being broken away and shown in section. Fig. 2, represents a front elevation of the same. Fig. 3, represents a sectional detail view taken on line 3—3 Fig. 4, to show the locking device for the speed control levers. Fig. 4, represents an enlarged sectional view taken on line 4—4 Fig. 2 to show the operating mechanism.

Similar numbers of reference designate corresponding parts throughout.

As shown herein in its preferred form the improved mixing machine has the base 5 furnished with column 6 which carries the casing 7 furnished with the laterally extending members 8, 8 forming supports for the vertical guide rods 9, 9 having their lower ends seated in sockets of the base 5. On the casing 7 is mounted the cover 10 which has the collars 11, 12, and 13 adapted to receive suitable bearing sleeves or bushings. The casing 7 is also furnished with the slots 14 and 15 adjacent to which, on the exterior of the casing 7 and its cover 10 is mounted the plate 16 having the notches 17, 17 and 18, 18. Extending from one side of the casing 7 is the bearing sleeve 19 and the bracket 20 in the former of which is journaled the main drive shaft 21 on which is rotatable the drive pulley 22 having any usual clutch connection 23, controlled by the lever 24, for connecting said pulley with said shaft 21, bracket 20 affording a support to said lever 24. At the inner end of said main shaft 21 is mounted the miter gear 25 which is in constant engagement with similar gears 26 and 27 journaled on the bucket operating shaft 28 which latter is journaled in bearings carried by the collar 11, and a similar collar of the casing 7, and has at its lower portion the screw thread 29 of any desired pitch. Between the gears 26 and 27 is located the double clutch member 30 slidable on shaft 28 but splined thereto to always rotate therewith and having friction faces adapted to frictionally engage the socket of either of said gears 26 or 27 toward which said clutch member 30 is moved by the shifter 31 engaged with said clutch member 30, and mounted on the laterally extending shaft 32 which is journaled in bearings of the casing 7 and has at its outer end the lever 33 furnished with the extension 34.

Slidable on the guide rods 9, 9 are the sleeves 35 and 36 of the frame 37 which carries the bucket or other container 38, preferably of the shape shown in Fig. 1, for the material under operation. This frame 37 has the projection 39 having a vertical screw threaded perforation in which screw 29 of shaft 28 is engaged whereby the rotation of said shaft 28 effects the vertical movement of said frame 37 and the container 38 carried thereby, the extent of such movement being limited through the medium of rod 40 carried by an extension of the sleeve 35 and having the adjustable stops 41 and 42 which respectively engage the extension 34 of lever 33 in the upward or downward movement of said rod 40 to effect the actuation of said extension and of shaft 32 to shift the clutch member 30 from one of the gears 26 or 27 to the other of said gears whereby the direction of the rotation of shaft 28 is changed and the direction of movement of the frame 37 and its container is reversed.

Fixed to the gear 26 and constantly rotating therewith on shaft 28 is the gear 43 through which motion is transmitted to the large gear 44 fixed on shaft 45 which is journaled in a step bearing of casing 7 and in the bearing of collar 12 and has the gears 46, 47 and 48, of different diameters, fixed thereto and the collars 49 and 50 free thereon. Pivotally mounted on said collars 49 and 50 are the levers 51 and 52 which respectively extend through the slots 14 and 15 and have the projections 53 and 54 which, by slight lateral movements of said levers may be engaged with the notches 17 or 18 respectively of the plate 16. In order to prevent the simultaneous movement of both of said levers 51 and 52 from the intermediate or free position I provide the locking plate 55 pivotally mounted on an extension from the casing 7 and having the notches 56 and 57, see Fig. 3, having cam edges and located to register with said levers 51 and 52 when said levers are in the intermediate position shown in said Fig. 3, one of said levers being engaged and locked from movement while the other lever is free, so that if the operator should move either lever from said position the lever so moved would present an obstacle to the swinging of plate 55 in a direction to release the other of said levers.

Pivotally connected with the respective levers 51 and 52 are the double clutch members 60 and 61, and 62 and 63 which slidably engage to rotate with shaft 64 journaled in the bearing of collar 13 and of a similar collar of casing 7 and furnished with the freely rotatable gears— 65, 66, 67 and 68 which respectively mesh with the gears 44, 46, 47 and 48 and differ in diameter from said gears. These gears 65, 66, 67 and 68 are arranged in pairs relative to their clutch members 60, 61 and 62, 63 and have clutch engagements complemental to such members whereby the movement up or down of lever 51 may effect the engagement of clutch member 60 or 61 with its related gear 65 or 66 and thus the driving of shaft 64 at a speed proportionate to the relative diameters of gears 44 and 65 or of 46 and 66 while the similar movement of lever 52 will effect similar connection of gear 67 or of gear 68 with said shaft 64, as the case may be.

Mounted on the lower portion of the casing 7 is the internal rack 69 and on the lower end of shaft 64 is fixed the frame 70 having the lip 71, which embraces said rack 69, and a bearing parallel to and offset from shaft 64 in which is journaled the mixer or paddle shaft 72 having at its upper end the pinion 73, which meshes with the rack 69, and at its lower end the paddle 74 which extends into the bucket or other container 38.

The operation readily will be understood from the above description and by reference to the drawings.

Dough or other material of suitable consistency is placed in the bucket 38 and power is applied to the shaft 21 and the gears 26 and 27 are driven by gear 25. Lever 33 is now swung to bring clutch member 30 into engagement with one of said gears 26 or 27 and said clutch member and the shaft 28 to which it is connected will be driven whereby screw 29 will act to move frame 37 and its bucket 38 upward or downward, as the case may be, until the limit of such movement is reached at which time one of the stops 41 or 42 on rod 40 will act to swing the extension 34 of lever 33 and thus effect the shifting of the clutch member 30 into connection with the other of said gears 26 or 27 whereby the direction of the rotation of shaft 28 is changed. During such vertical movement of the bucket 38 one of the levers 51 or 52 is moved to effect the connection of one of its clutch members with one of its related gears whereby the shaft 64 and its frame 70 are caused to rotate thus driving pinion 73 around in engagement with rack 69 whereby a rotary and gyratory motion is transmitted to shaft 72 and its paddle or beater 73 whereby as the material is moved vertically it is mixed and beaten by such rotary movement of the beater during the gyratory path thereof.

Preferably the paddle or beater 73 has a width somewhat greater than one half the diameter of the bucket 38 so that the rotary motion of the beater effects the mixing of material from the axis of the bucket toward its wall and vice versa.

Having thus described my invention I claim as new and desire to secure by Letters Patent.

1. A mixing machine comprising a frame slidably mounted, a container in said frame, a rotary shaft having a worm engaged with said frame, a clutch, drive gears adapted to be connected by said clutch with said shaft, and mechanism including a rod and stops automatically operated by the movement of said frame for shifting said clutch into and out of connection with said respective gears.

2. In a mixing machine, the combination with a rotary gyratory beater, of a frame slidably mounted, a container adapted to receive said beater carried by said frame, a rod carried by said frame and having a pair of stops, a worm shaft rotatably mounted and having engagement with said frame, drive gear including a pair of gears free on said shaft and a slidable clutch connected with said shaft and adapted to engage either of said gears, a shifter for said clutch, and actuating means for said shifter extending into the path of said stops, and adapted to automatically change the direction of movement of the frame thereby.

3. A mixing machine comprising a container frame mounted to slide vertically, a rotary worm shaft in engagement with said frame, means for driving said shaft and automatically changing the direction of its rotation, a rotary gyratory beater, a driven gear on said worm shaft, and a train of gears including an internal rack for transmitting motion from said driven gear to said beater.

4. A mixing machine comprising a casing, driven shafts journaled therein, a container, means including one of said shafts for reciprocating said container and including automatic direction changing mechanism, an internal tooth rack fixed upon the bottom of said casing to embrace another one of said driven shafts, a frame fixed to the lower end of said last named driven shaft and embracing said rack, a beater shaft journaled in said frame parallel to said latter named shaft and supported thereby, a pinion on said beater shaft meshing with said rack and a beater upon the pivot shaft and adapted to enter said container.

LEWIS F. FALES.

Witnesses:
WILLIAM H. CLARKE,
WALTER C. ROCKWOOD.